United States Patent [19]
Tetsuo et al.

[11] 3,988,273
[45] Oct. 26, 1976

[54] AQUEOUS COATING COMPOSITION
[75] Inventors: Aihara Tetsuo; Watanabe Tadashi; Nakayama Yasuharau; Yamashita Yoshio; Toyomoto Isao, all of Hiratsuka, Japan
[73] Assignee: Kansai Paint Company, Ltd., Amagasaki, Japan
[22] Filed: Mar. 19, 1975
[21] Appl. No.: 559,769

[30] Foreign Application Priority Data
Mar. 28, 1974 Japan.............................. 49-34960

[52] U.S. Cl.................... 260/23 AR; 260/31.2 R; 260/31.8 XA; 260/736; 260/29.6 TA; 428/147; 526/273
[51] Int. Cl.$^2$.......................................... C08L 91/00
[58] Field of Search ........ 260/23 R, 23 AR, 31.2 R, 260/31.8 XA, 31.8 M, 37 R, 736, 78.4 E; 427/407, 417; 428/147

[56] References Cited
UNITED STATES PATENTS
3,530,100  9/1970  D'A'lelio......................... 260/23 AR
3,694,388  9/1972  Connelly et al................ 260/23 AR

*Primary Examiner*—Lewis T. Jacobs
*Assistant Examiner*—William E. Parker
*Attorney, Agent, or Firm*—Larson, Taylor and Hinds

[57] ABSTRACT
An aqueous coating composition comprising an aqueous medium and a binder resin dispersed therein as neutralized with a base, the binder resin being a copolymer of (A) a monomer prepared by reacting at least one glycidyl ester of acrylic acid and methacrylic acid with at least one fatty acid of drying oil fatty acid and semi-drying oil fatty acid, (B) and $\alpha,\beta$-ethylenically unsaturated acid and (C) an unsaturated monomer containing substantially no carboxyl group and having a Q value of at least 0.1 as determined by Q-e theory.

10 Claims, No Drawings

AQUEOUS COATING COMPOSITION

This invention relates to aqueous coating compositions, and more particularly to an aqueous coating composition which is curable at ambient temperatures.

Conventional aqueous coating compositions which cure at ambient temperatures are prepared by dissolving or dispersing a binder resin in an aqueous medium. For this purpose various binder resins are known, among which alkyd resins are most widely used because they give coatings which are superior to those prepared from other binder resins in properties such as hardness, adhesiveness and resistance to solvents. However, since alkyd resins have many ester bonds on the main chain, they have the drawback of being susceptible to hydrolysis, which impairs the water resistance, alkali resistance storage-stability, and weather resistance of the coating prepared therefrom.

The object of this invention is to provide an aqueous coating composition which is curable at ambient temperatures and which is rendered free of the foregoing drawback based on the hydrolysis without sacrificing the advantages described. More specifically stated, it is the object of this invention to provide an aqueous coating composition which cures at ambient temperatures, forming coatings which are excellent in hardness, adhesiveness and resistance to solvents as well as in water resistance, alkali resistance, storage-stability and weather resistance.

The above object is accomplished by dissolving or dispersing in an aqueous medium a binder resin as neutralized with a base, the binder resin being a copolymer of (A) a monomer prepared by reacting at least one glycidyl ester of acrylic acid and methacrylic acid with at least one fatty acid of drying oil fatty acid and semi-drying oil fatty acid (hereinafter referred to as "modified monomer A"), (B) an α, β-ethylenically unsaturated acid (hereinafter referred to as "unsaturated acid B") and (C) an unsaturated monomer containing substantially no carboxyl group and having a Q value of at least 0.1 as determined by Q-e theory (hereinafter referred to as "unsaturated monomer C").

The Q-e theory referred to above was advocated by Alfrey and Price for the first time in 1947 as to the velocity of addition reaction of a monomer with a radical, and the Q value is a constant representing the general reactivity of the monomer as an essential factor of the theory. Generally, the greater the Q value, the higher is the radical reactivity of the monomer concerned. The Q-e theory is set forth for example in T. Alfrey, Jr., C. C. Price, Journal Polymer Science 2, 101 (1947) and T. Alfrey, Jr., J. J. Bohrer, H. Mark, Copolymerization (Interscience Publishers, New York, 1952).

The modified monomer A, a component of the copolymer resin to be used in this invention, is a monomer prepared by reacting a glycidyl ester of acrylic acid or methacrylic acid with drying oil fatty acid and/or semi-drying oil fatty acid. It is a reaction product of 1 mole of fatty acid and 0.8 to 1.2 moles of glycidyl ester of acrylic acid or methacrylic acid. Useful for the preparation of the modified monomer A are various drying oil fatty acids and semi-drying oil fatty acids having about 4 to 26 carbon atoms. At least one of such fatty acids is used. Examples of these fatty acids are safflower oil fatty acid, linseed oil fatty acid, soybean oil fatty acid, sesame oil fatty acid, poppyseed oil fatty acid, perilla oil fatty acid, hempseed oil fatty acid, grape-kernel oil fatty acid, corn oil fatty acid, tall oil fatty acid, sunflower oil fatty acid, cottonseed oil fatty acid, walnut oil fatty acid, rubberseed oil fatty acid, sugar cane oil fatty acid, etc., among which safflower oil fatty acid, linseed oil fatty acid, soybean oil fatty acid, perilla oil fatty acid, tall oil fatty acid, sunflower oil fatty acid and hempseed oil fatty acid are especially preferable. Also, unsaturated fatty acids having conjugated double bonds are usable as a part of drying oil fatty acid and semi-drying oil fatty acid. Examples of such conjugated fatty acid are tung oil fatty acid, oiticica oil fatty acid, dehydrated castor oil fatty acid and Hidiene fatty acid. (trade mark of conjugated fatty acid, produced by Soken Kagaku Co., Ltd., Japan.) The amount of the conjugated fatty acid is in the range of less than 30 wt.% based on total fatty acid.

Usable as glycidyl ester, the other component of the modified monomer A, are glycidyl acrylate and glycidyl methacrylate.

The modified monomer A is prepared usually by reacting the above two components at a temperature of 60° to 220° C, preferably 120° to 170° C, for about 0.5 to 40 hours, preferably 3 to 10 hours in the absence or presence of a reaction catalyst such as tetraethyl ammonium bromide, although these conditions vary with the kind of the fatty acid used. In order to render the modified monomer A more preservable, it is possible to add thereto a polymerization inhibitor such as hydroquinone, p-benzoquinone, etc.

A wide variety of acids having α, β-ethylenically unsaturated double bond are useful as the unsaturated acid B, another constituent of the copolymer to be used in this invention. Generally usable are acrylic acid, methacrylic acid, crotonic acid, maleic acid, maleic anhydride, fumaric acid and half esterified product of maleic acid having the following general formula:

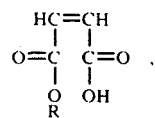

wherein R is alkyl having 1 to 4 carbon atoms, among which acrylic acid, methacrylic acid, crotonic acid, maleic acid, maleic anhydride and fumaric acid are preferable.

Usable as the unsaturated monomer C, another constituent of the copolymer to be used in this invention are unsaturated monomers containing substantially no carboxyl group and having a Q value of at least 0.1 as determined by Q-e theory, preferably those having a Q value of 0.1 to 1.5. When the unsaturated monomer C having a Q value of less than 0.1 is used, the obtained copolymer tends not to cure at ambient temperatures. Usable examples are various acrylates or methacrylates, acrylonitrile or methacrylonitrile, acrylic or methacrylic amides, olefins having an aromatic or heterocyclic ring, dienes, etc. These monomers are used singly or in admixture with one another. Examples of the above-mentioned acrylates or methacrylates are versatile and include acrylates or methacrylates of alkyl having about 1 to 18 carbon atoms, alkoxy-substituted alkyl, allyl-substituted alkyl, amino-substituted alkyl, allyloxy-substituted alkyl, hydroxy substituted alkyl, glycidyl, etc. More specific examples are methyl acrylate or methacrylate, ethyl acrylate or methacrylate, propyl acrylate or methacrylate, butyl acrylate or methacrylate, 2-ethylhexyl acrylate, 2-ethylhexyl methacrylate, lauryl acrylate, lauryl methacrylate, stearyl acrylate or methacrylate, glycidyl acrylate or methacrylate, methoxybutyl acrylate or methacrylate, methoxyethyl acrylate or methacrylate, ethoxybutyl acrylate or methacrylate, allyl acrylate or methacrylate, hydroxyethyl acrylate or methacrylate, hydroxypropyl acrylate or methacrylate, diethylaminoethyl acrylate or methacrylate, allyloxyethyl acrylate or methacrylate, esterified product of glycidyl acrylate or glycidyl methacrylate with saturated fatty acid having 1 to 18 carbon atoms, etc. Examples of olefins having an aromatic or heterocylic ring are styrene, α-methylstyrene, vinyltoluene, vinylpyridine, etc. Examples of dienes include butadiene, isoprene, chloroprene, etc. Exemplary of acrylic or methacrylic amides are N-methylolacrylamide, N-methylolmethacrylamide, N-butoxymethylacrylamide, N-butoxymethylmethacrylamide, etc.

Especially preferable to use are styrene, vinyltoluene and acrylic or methacrylic esters represented by the formula

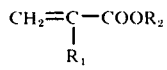

wherein $R_1$ is hydrogen or methyl, $R_2$ is alkyl with 1 to 8 carbon atoms, and $R_1$ is methyl when $R_2$ is ethyl.

The proportions of modified monomer A, unsaturated acid B and unsaturated monomer C used to prepare the copolymer are 7.5 to 95 wt.% for modified monomer A, 5 to 20 wt.% for unsaturated acid B and 0.01 to 87.5 wt.% for unsaturated monomer C, and are preferably about 25 to 80 wt.% for monomer A, about 7.5 to 17.5 wt.% for unsaturated acid B and about 5 to 67.5 wt.% for unsaturated monomer C. The copolymer usually has an acid value of about 25 to 150 and an average molecular weight of about 500 to 80,000, preferably an acid value of 45 to 130 and an average molecular weight of about 1,000 to 50,000.

The amount of modified monomer A, if less than 7.5 wt.% impairs curing property at ambient temperatures, also, if more than 95 wt.% is used, it is impossible to render the obtained copolymer water soluble.

On the other hand, if less than 5 wt.% of unsaturated acid B is used, it is difficult to render the obtained copolymer water soluble, but the amount more than 20 wt.% impairs water resistance of the cured coating film. Further, unsaturated monomer C is used to adjust the properties of the copolymer obtained. Thus constituent proportions outside the foregoing range is objectionable.

The polymerization of modified monomer A, unsaturated acid B and unsaturated monomer C can be conducted under the same conditions as in the conventional polymerization. For example, polymerization can be conducted in solvent in the absence or presence of a radical initiator or under irradiation of radiations. Initiators to be used are, for example, organic or inorganic peroxides, sulfides, sulfines, sulfinic acids, azo compounds, diazo compounds, nitroso compounds, redox initiators, etc. Besides there may be used actinic light, electron beam, γ-ray, X-ray, etc. singly or in combination with the above initiators.

The polymerization is carried out at a temperature of 0° to 200° C, preferably about 40° to 170° C for 1 to 20 hours, preferably for about 6 to 10 hours. Especially preferable is a polymerization method employing a solvent in which the copolymer obtained is soluble and which is miscible with water. This method has the advantage that the copolymer obtained is usable as it is for the preparation of aqueous coating composition of this invention without the necessity of removing the solvent from the copolymer. Examples of such water soluble solvent are solvents represented by ROH wherein R is alkyl having 1 to 4 or 6 carbon atoms, such as methyl alcohol, ethyl alcohol, propyl alcohol, butyl alcohol and hexyl alcohol; solvents represented by $HO-CH_2CH_2-OR$ wherein R is hydrogen or alkyl having 1 to 8 carbon atoms, such as ethylene glycol, ethylene glycol monobutyl ether and ethylene glycol monoethyl ether; solvents represented by $HO-CH_2CH_2-OCH_2CH_2OR$ wherein R is the same as above, such as diethylene glycol, diethylene glycol monomethyl ether and diethylene glycol monobutyl ether; solvents represented by $R_1O-CH_2CH_2-OR_2$ wherein $R_1$ and $R_2$ are each alkyl having 1 to 3 carbon atoms, such as ethylene glycol dimethyl ether; solvents represented by $R_1O-CH_2CH_2OCH_2-CH_2OR_2$ wherein $R_1$ and $R_2$ are the same as above, such as diethylene glycol dimethyl ether; solvents represented by $RO-CH_2CH_2OCO-CH_3$ wherein R is the same as above, such as ethylene glycol monoacetate and ethylene glycol monomethyl ether acetate; diacetone alcohol; dioxane; tetrahydrofuran; acetone; dimethylformamide; etc. For the preparation of the copolymer of this invention, water insoluble solvents are also usable if they have a boiling point of up to 250° C, because such solvents are removable by distillation at atmospheric or reduced pressure after the completion of the polymerization reaction. These solvents include, for example, toluene, xylene and like aromatic solvents.

The amount of such solvent, which is variable over a wide range, is usually about 15 to 90 wt.%, preferably about 30 to 75 wt.%, based on the copolymer solution.

To render the copolymer thus prepared soluble or dispersible in water, the carboxyl groups in the copolymer are neutralized with a neutralizing agent. Useful for this purpose are a wide variety of known neutralizing agents such as hydroxides, carbonates or bicarbonates of alkali metals, ammonia and amines. Examples of amines are primary, secondary and tertiary alkylamines or aliphatic amines and primary, secondary and tertiary alkanol amines or alicyclic amines, etc. Preferable examples of hydroxides of alkali metals are lithium hydroxide, sodium hydroxide, potassium hydroxide, etc., those of alkali metal carbonates are sodium carbonate, potassium carbonate, etc. and those of alkali metal bicarbonates include lithium bicarbonate, sodium bicarbonate and potassium bicarbonate. The copolymer is effectively neutralized under conventional conditions; for example, the copolymer is contacted with a neutralizing agent, preferably with an aqueous solution thereof.

The neutralized copolymer is then dissolved or dispersed in an aqueous medium to prepare an aqueous coating composition according to this invention. The aqueous medium is water or a mixture of water and water-soluble organic solvent. The organic solvent needs only to be soluble in water. Examples are methyl alcohol, ethyl alcohol and like alcoholic solvents; ethylene glycol, ethylene glycol monobutyl ether and like solvents; diethylene glycol, diethylene glycol monomethyl ether and like solvents; ethylene glycol dimethyl ether and like solvents; diethylene glycol dimethyl ether and like solvents; ethylene glycol monoacetate, ethylene glycol monomethyl ether acetate and like solvents; dioxane; tetrahydrofuran; acetone; dimethylformamide; etc. These solvents are used singly or in admixture with one another. The amount of such organic solvent to be used is up to 50 wt.%, preferably up to about 25 wt.%, based on the mixture.

The proportions of copolymer and aqueous medium in the aqueous coating composition of this invention vary widely depending on the kind of the article to be coated therewith, coating means, etc. Usually 5 to 70 wt.%, preferably 10 to 60 wt.%, of the copolymer is used based on the composition.

The composition of this invention may contain various coloring pigments, extender pigments and driers as desired.

Examples of extender pigments are calcium carbonate, clay, talc, white carbon, etc. Usable as driers are a wide variety of known driers such as cobalt naphthenate, lead naphthenate, etc. Where necessary, it is possible to add a dispersant, stabilizer, defoamer, preservatives and like additives.

The aqueous coating composition of this invention cures at ambient temperatures and is very useful in giving coatings which are excellent in hardness, adhesiveness and resistance to solvents as well as in water resistance, alkali resistance and weather resistance.

Although the present coating composition is of the type which cures at ambient temperatures, it can be made to cure with heating without any adverse effect.

Examples of this invention are given below, in which all the parts and percentages are by weight.

EXAMPLE 1

(1-a)

Into a 1-l reactor are placed 236 parts of linseed oil fatty acid, 119 parts of glycidyl methacrylate, 0.4 part of hydroquinone and 0.2 part of tetraethyl ammonium bromide, which are then heated at 140° – 150° C with stirring. The amount of residual carboxyl groups is measured to confirm the progress of the reaction between epoxy groups and carboxyl groups. The reaction is completed in about 4 hours to produce monomer (1-a) modified with the fatty acid. (1-b)

Into a 1-l reactor 100 parts of ethylene glycol monobutyl ether is placed and heated at 120° C, to which a mixture of 40 parts of the monomer (1-a), 47 parts of n-butylmethacrylate, 13 parts of acrylic acid and 5 parts of azobisdimethylvaleronitrile is added dropwise over a period of about 2 hours at the same temperature with stirring. The reaction is conducted under nitrogen atmosphere. To the resulting reaction product 1 part of azobisisobutyronitrile is added 1 hour after the addition of the mixture and 1 part of azobisisobutyronitrile is further added 2 hours after the first addition of the azobisisobutyronitrile. The mixture is thereafter maintained at the same temperature for 3 hours for further reaction to produce copolymer (1-b) having an acid value of 91 and a conversion of 99.5%. (1-c)

Into a 1-l reactor is placed 50 parts of ethylene glycol monobutyl ether, which is then heated at 120° C and to which a mixture of 60 parts of the monomer (1-a), 30 parts of n-butylmethacrylate, 10 parts of acrylic acid and 4 parts of azobisisobutyronitrile is added dropwise at the same temperature over a period of about 2 hours with stirring while the interior air is being replaced by nitrogen gas. Two 1-part portions of azobisisobutyronitrile are added to the resulting reaction product 1 hour after and 3 hours after the addition of the mixture, each portion respectively. The resulting mixture is kept at the same temperature for three hours for further reaction to produce copolymer (1-c) having an acid value of 75 and a conversion of 99.7%.

EXAMPLE 2

(2-a)

Into a 1-l reactor are placed 236 parts of safflower oil fatty acid, 119 parts of glycidyl methacrylate and 0.3 part of hydroquinone, and the resultant mixture is allowed to react at 140° to 150° C for about 5 hours with stirring. The progress of the reaction is ascertained in the same manner as in Example 1, (1-a) to find that the reaction takes about 5 hours for completion.

(2-b)

To 50 parts of ethylene glycol monobutyl ether kept at 120° C in a 1-l reactor is dropwise added, over a period of about 2 hours with stirring, a mixture of 40 parts of the reaction product (2-a), 47 parts of styrene, 13 parts of acrylic acid and 5 parts of azobisdimethylvaleronitrile. The reaction is conducted under nitrogen atmosphere. An hour after the completion of the addition, 1 part of azobisdimethylvaleronitrile is added to the reaction mixture and, 2 hours later, 1 part of azobisdimethylvaleronitrile is further added. The resultant mixture is then allowed to react at 120° C for 2.5 hours to produce a polymer having a conversion of 99.2% and an acid value of 91.

(2-c)

To 50 parts of ethylene glycol monobutyl ether kept at 120° C in a 1-l reactor is added dropwise, over a period of 2 hours with stirring, a mixture of 40 parts of the reaction product (2-a), 44 parts of n-butyl methacrylate, 16 parts of methacrylic acid and 4.5 parts of azobisdimethylvaleronitrile with the air in the reactor replaced by nitrogen. An hour after the completion of the addition, 1 part of azobisisobutyronitrile is added to the reaction mixture and, two hours later, 1 part of azobisisobutyronitrile is further added. The resulting mixture is kept for further reaction at 120° C for 3 hours to produce a polymer having a conversion of 99.5% and an acid value of 97.

(2-d)

To 100 parts of ethylene glycol monobutyl ether kept at 120° C in a 1-l reactor is added dropwise, over a period of 2 hours with stirring, a mixture of 90 parts of the reaction product (2-a), 2 parts of n-butyl methacrylate, 8 parts of acrylic acid and 5 parts of azobisdimethylvaleronitrile, with the air in the reactor replaced by nitrogen. An hour after the completion of the addition, 1 part of azobisisobutyronitrile is added to the reaction mixture and, 2 hours later, 1 part of azobisisobutyronitrile is further added. The resultant mixture thus obtained is allowed to react at 120° C for 3 hours to produce a polymer having a conversion of 99.7% and an acid value of 58.

(2-e)

To 50 parts of ethylene glycol monoethyl ether kept at 120° C in a reactor is added dropwise, over a period of 2 hours with stirring, a mixture of 40 parts of the reaction product (2-a), 23 parts of methyl methacrylate, 24 parts of n-butyl methacrylate, 13 parts of acrylic acid and 5 parts of azobisisobutyronitrile, with the air in the reactor replaced by nitrogen. An hour after the completion of the addition, 1 part of azobisisobutyronitrile is added to the reaction mixture and, 2 hours later, 1 part of azobisisobutyronitrile is further added. The resultant mixture obtained is allowed to react at 120° C for 3 hours to produce a polymer having a conversion of 99.8% and an acid value of 92.

(2-f)

To 50 parts of n-butyl cellosolve kept at 120° C in a 1-*l* reactor is added dropwise, over a period of 2 hours with stirring, a mixture of 25 parts of the reaction product (2-a), 37 parts of styrene, 20 parts of lalurylmethacrylate, 18 parts of methacrylic acid and 5 parts of azobisdimethylvaleronitrile, with the air in the reactor replaced by nitrogen. An hour after the completion of the addition, 1 part of azobisisobutyronitrile is added to the reaction mixture and, 2 hours later, 1 part of azobisisobutyronitrile is further added. The resultant mixture obtained is reacted at 120° C for 3 hours to produce a polymer having a conversion of 99.5% and an acid value of 115.

Example 3

(3-a)

Into a 1-*l* reactor 236 parts of soybean oil fatty acid, 119 parts of glycidyl methacrylate and 0.3 part of hydroquinone are placed. The mixture is allowed to react at 140° to 150° C with stirring. The reaction takes about 6 hours for completion, as determined in the same manner as in Example 1, (1-a).

(3-b)

To 50 parts of diethylene glycol monobutyl ether kept at 120° C in a reactor is added dropwise, over a period of about 2 hours with stirring, a mixture of 40 parts of the reaction product (3-a), 23 parts of styrene, 24 parts of n-butyl methacrylate, 13 parts of acrylic acid and 5 parts of azobisdimethylvaleronitrile. The mixture is allowed to react while being maintained at a temperature of 120° C under nitrogen atmosphere. To the reaction mixture is added 1 part of azobisisobutyronitrile 1 hour after the dropwise addition, this being followed by further addition of 1 part of the same nitrile 2 hours later. The reaction is thereafter continued at 120° C for 3 hours to give a polymer having a conversion of 99.3% and an acid value of 90.

(3-c)

Into a 1-*l* reactor 50 parts of ethylene glycol monobutyl ether is placed, which is heated to 120° C. To the solution is added dropwise, over a period of 2 hours with stirring, a mixture of 12 parts of the reaction product (1-a), 28 parts of the reaction product (2-a), 23 parts of styrene, 24 parts of n-butyl methacrylate, 13 parts of acrylic acid and 5 parts of azobisisobutyronitrile. The mixture is allowed to react in the same manner as above (3-b) with the addition of azobisisobutyronitrile to obtain a polymer having an acid value of 92 and a conversion degree of 99.5%.

EXAMPLE 4

(4-a)

Into a 1-*l* reactor are placed 236 parts of safflower oil fatty acid, 108 parts of glycidyl acrylate, 1.2 parts of hydroquinone and 0.2 part of tetraethyl ammonium bromide, which are then heated at 140° –150° C with stirring. The amount of residual carboxyl groups is measured to confirm the progress of the reaction between epoxy groups and carboxyl groups. The reaction is completed in about 4 hours to produce monomer (4-a) modified with the fatty acid. (4-b)

Into a 1-*l* reactor 50 parts of n-butyl cellosolve is placed and heated at 120° C, to which a mixture of 40 parts of the monomer (4-a), 44 parts of styrene, 16 parts of methacrylic acid and 5 parts of azobisdimethylvaleronitrile is added dropwise over a period of about 2 hours at the same temperature with stirring. The reaction is conducted under nitrogen atmosphere. To the resulting reaction product 1 part of azobisisobutyronitrile is added 1 hour after the addition of the mixture and 1 part of azobisisobutyronitrile is further added 2 hours after the first addition of the azobisisobutyronitrile. The mixture is thereafter maintained at the same temperature for 3 hours to produce copolymer (4-b) having an acid value of 95 and a conversion of 99.5%.

Reference Example 1

(Ref. 1-a)

Into a 1-*l* reactor are placed 236 parts of Hidiene fatty acid (trade mark, conjugated fatty acid, product of Soken Kagaku Co., Ltd., Japan), 119 parts of glycidyl methacrylate, 0.4 part of hydroquinone and 0.2 part of tetraethyl ammonium bromide, which are allowed to react at 120° to 130° C with stirring. The reaction takes about 7 hours for completion, as determined in the same manner as in Example 1, (1-a).

(Ref. 1-b)

Into a 1-*l* reactor is placed 50 parts of ethylene glycol monobutyl ether, which is heated to 120° C. To the solution is added dropwise, over a period of 2 hours and with stirring, a mixture of 20 parts of the reaction product (Ref. 1-a), 67 parts of n-butyl methacrylate, 13 parts of acrylic acid and 5 parts of azobisdimethylvaleronitrile. The mixture is allowed to react at 120° C. One hour after the completion of the dropwise addition, 1 part of azobisisobutyronitrile is added to the resulting reaction mixture. The mixture gels in about 30 minutes.

Example 5

The copolymers obtained in Examples 1 to 4 are rendered water-soluble by being neutralized with about 1.0 equivalent of 28% ammonia water based on the carboxyl groups in the copolymers. The copolymer (2-c) only is neutralized with 1.0 equivalent of triethylamine. The pigment and driers listed in Table 1 below are then added to the aqueous solutions of polymers thus prepared to formulate coating compositions. The pigment is dispersed using a usual paint conditioner.

The aqueous coating compositions obtained in Example 5 are applied to polished mild steel sheets of 0.7 mm thickness to form coating films, which are tested to determine the properties thereof. The compositions are applied by a bar coater. The viscosity is adjusted with water and water-soluble solvent (ethylene glycol monobutyl ether). The coating film is about 25-micron thick and is dried at 20° C at a humidity of 75% for 7 days. Test methods which are employed to determine the properties of coating film are as follows:

Pencil hardness

After a specimen has been left for 24 hours in a thermo-hydrostated chamber maintained at a temperature of 20°±1° C and a relative humidity of 75±3%, it is set horizontally in the chamber and strongly scratched with a sharpened pencil. The value is expressed by the hardness of the hardest pencil which can not make a scratch on the coated surface.

Gloss value

It is the measured value of reflectance percent of a mirror surface at an angle of 60° according to ASTM D-333.

Erichsen value

Determined by an Erichsen tester at 20° C according to JIS Z 2247.

Cross-cut test 100 of squares reaching to the substrate are cut at intervals of 1 mm. on the surface film coated on a soft iron plate. Adhesive tape is stuck onto it, pressed uniformly with a uniform force and peeled off rapidly. The number of remaining squares is counted and expressed as follows.

Evaluation=S/100

S:number of remaining squares The coated plate is put in a thermo-hydrostated chamber maintained at a temperature of 20°±1° C and a relative humidity of 75±3% for an hour, and then this grid test is carried out using the same chamber.

Water resistance

After a specimen is immersed in tap water at 20° C for 2 weeks, the state of coating film is observed.

Solvent resistance

After a specimen is immersed in gasoline (trade mark: "Silver Gasoline", product of Nippon Oil Co., Ltd., Japan) at 20° C for 2 weeks, the state of coating film is observed.

Weather resistance

Accelerated weather resistance is determined in terms of the gloss retentivity of the coating film which is exposed to a weather-o-meter of sunshine type for 250 hours.

Storage stability

The viscosity of coating composition is measured by Kreb's Stormer viscometer after the composition has been left to stand at 40° C for 40 days. The results are given in Table 1.

Du Pont impact test

After leaving a test panel to stand in a constant temperature and constant humidity chamber at a temperature of 20°±1° C and a humidity of 75% for 1 hour, the following test is conducted in the same chamber. A bearer and a center of impact of prescribed sizes are fitted to a Du Pont impact tester and a test panel is put between them, turning the coated surface of the test panel upward. The prescribed weight is dropped on the center of impact from the prescribed height the test panel is taken out, and after having been left for an hour in the room, the damage of surface is observed. The large height (cm) of the weight entailing no cracking in the coating is determined.

Table 1

|  | (1-b) | (1-c) | Example (2-b) | (2-c) | (2-d) |
|---|---|---|---|---|---|
| Coating composition |  |  |  |  |  |
| Neutralized copolymer soln. | 200 | 158 | 158 | 158 | 200 |
| Water | 194 | 228 | 230 | 240 | 195 |
| Rutile-type titanium dioxide | 80 | 80 | 80 | 80 | 80 |
| Driers* |  |  |  |  |  |
| Lead naphthenate | 0.5 | 0.5 | 0.5 | 0.5 | 0.5 |
| Cobalt naphthenate | 0.05 | 0.05 | 0.05 | 0.05 | 0.05 |
| Properties of coating |  |  |  |  |  |
| Pencil hardness | 2B | 2B | H | B | B |
| Impact strength (cm) | 40 | 40 | 20 | 40 | 40 |
| Erichsen value (mm) | >8.0 | >8.0 | >7.0 | >8.0 | >8.0 |
| Cross-cut test | 100/100 | 100/100 | 100/100 | 100/100 | 100/100 |
| Water resistance | No change | No change | No change | No change | No change |
| Solvent resistance | No change | No change | No change | No change | No change |
| Weather resistance |  |  |  |  |  |
| Initial gloss | 88 | 89 | 90 | 86 | 92 |
| Gloss in 250 hrs. | 80 | 81 | 80 | 79 | 81 |
| Storage stability |  |  |  |  |  |
| Initial viscosity (K,u) | 89 | 88 | 86 | 88 | 87 |
| Viscosity in 40 days (K,u) | 81 | 80 | 78 | 81 | 80 |

|  | (2-e) | (2-f) | Example (3-b) | (3-c) | (4-b) |
|---|---|---|---|---|---|
| Coating composition |  |  |  |  |  |
| Neutralized copolymer soln. | 158 | 100 | 158 | 158 | 100 |
| Water | 227 | 231 | 230 | 232 | 230 |
| Rutile-type titanium dioxide | 80 | 80 | 80 | 80 | 80 |
| Driers* |  |  |  |  |  |
| Lead naphthenate | 0.5 | 0.5 | 0.5 | 0.5 | 0.5 |
| Cobalt naphthenate | 0.05 | 0.05 | 0.05 | 0.05 | 0.05 |
| Properties of coating |  |  |  |  |  |
| Pencil hardness | HB | HB | HB | HB | HB |
| Impact strength (cm) | 40 | 20 | 40 | 40 | 25 |
| Erichsen value (mm) | >8.0 | >7.0 | >8.0 | >8.0 | >8.0 |
| Cross-cut test | 100/100 | 100/100 | 100/100 | 100/100 | 100/100 |
| Water resistance | Blistering in 5 days | No change | No change | No change | No change |
| Solvent resistance | No | No | No | No | No |

Table 1-continued

| Weather resistance | change | change | change | change | change |
|---|---|---|---|---|---|
| Initial gloss | 87 | 90 | 93 | 92 | 89 |
| Gloss in 250 hrs. | 80 | 81 | 80 | 81 | 81 |
| Storage stability | | | | | |
| Initial viscosity (K.u) | 86 | 88 | 88 | 89 | 89 |
| Viscosity in 40 days (K.u) | 79 | 82 | 78 | 80 | 81 |

| | Comparison Example** |
|---|---|
| Coating composition | |
| Neutralized copolymer soln. | 200 |
| Water | 170 |
| Rutile-type titanium dioxide | 80 |
| Driers* | |
| Lead naphthenate | 1.0 |
| Cobalt naphthenate | 0.1 |
| Properties of coating | |
| Pencil hardness | B |
| Impact strength (cm) | 40 |
| Erichsen value (mm) | >8.0 |
| Cross-cut test | 100/100 |
| Water resistance | Blistering in 2 days |
| Solvent resistance | No change |
| Weather resistance | |
| Initial gloss | 84 |
| Gloss in 250 hrs. | 52 |
| Storage stability | |
| Initial viscosity (K.u) | 88 |
| Viscosity in 40 days (K.u) | Separation into 2 layers |

Note:
*Lead naphthenate and cobalt naphthenate are added in amounts of 0.5 PHR and 0.05 PHR to the compositions of this invention respectively and in twice the amounts to the composition of Comparison Example, the amounts being calculated as the corresponding metals.
**The composition is prepared by reacting 0.9 mole of linseed oil fatty acid, 0.6 mole of pentaerythritol, 0.4 mole of trimethylolethane and 1.0 mole of phthalic anhydride in a usual manner, reacting 0.5 mole of phthalic anhydride with the resulting product to obtain an alkyd resin having an acid value of 55, neutralizing the resin with ammonia water to render the resin soluble in water and to thereby prepare a 50% aqueous solution, and dispersing the pigment in the solution in the same manner as in Example 4.

What we claim is:

1. An aqueous coating composition comprising an aqueous medium and a binder resin dispersed therein as neutralized with a base, the binder resin being a copolymer of (A) a monomer prepared by reacting at least one glycidyl ester of acrylic acid and methacrylic acid with at least one fatty acid of drying oil fatty acid and semi-drying oil fatty acid, (B) an $\alpha,\beta$-ethylenically unsaturated acid and (C) an unsaturated monomer containing substantially no carboxyl group and having a Q value of at least 0.1 as determined by Q-e theory.

2. The aqueous coating composition according to claim 1, in which said monomer (A) is prepared by reacting one mole of at least one fatty acid of drying oil fatty acid and semi-drying oil fatty acid with 0.8 to 1.2 moles of at least one glycidyl ester of acrylic acid and methacrylic acid.

3. The aqueous coating composition according to claim 1, in which said fatty acid is at least one species selected from the group consisting of safflower oil fatty acid, linseed oil fatty acid, soybean oil fatty acid, perilla oil fatty acid, tall oil fatty acid sunflower oil fatty acid and hempseed oil fatty acid.

4. The aqueous coating composition according to claim 1, in which said $\alpha,\beta$-ethylenically unsaturated acid is at least one species selected from the group consisting of acrylic acid, methacrylic acid, crotonic acid, maleic acid, maleic anhydride and fumaric acid.

5. The aqueous coating composition according to claim 1, in which said Q value is 0.1 to 1.5.

6. The aqueous coating composition according to claim 1, in which said unsaturated monomer (C) is at least one species selected from the group consisting of styrene, vinyltoluene and acrylic or methacrylic acid esters represented by the formula

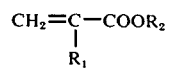

wherein $R_1$ is hydrogen or methyl, $R_2$ is alkyl with 1 to 8 carbon atoms, and $R_1$ is methyl when $R_2$ is ethyl.

7. The aqueous coating composition according to claim 1, in which said copolymer has an acid value of about 25 to 150 and an average molecular weight of about 500 to 80,000.

8. The aqueous coating composition according to claim 7, in which said acid value and average molecular weight are 45 to 130 and about 1,000 to 50,000 respectively.

9. The aqueous coating composition according to claim 1, in which said copolymer is composed of 7.5 to 95 wt.% of the monomer (A), 5 to 20 wt.% of the monomer (B) and 0.01 to 87.5 wt.% of the monomer (C).

10. The aqueous coating composition according to claim 9, in which the proportions of the monomers (A), (B) and (C) are about 25 to 80 wt.%, about 7.5 to 17.5 wt.% and 5 to 67.5 wt.%.

* * * * *

UNITED STATES PATENT OFFICE
CERTIFICATE OF CORRECTION

PATENT NO. : 3,988,273
DATED : October 26, 1976
INVENTOR(S) : Tetsuo Aihara et al It is certified that error appears in the above-identified patent and that said Letters Patent are hereby corrected as shown below:

The inventors' correct first and last names are as follows:

| First | Last |
|---|---|
| Tetsuo | Aihara |
| Tadashi | Watanabe |
| Yasuharau | Nakayama |
| Yoshio | Yamashita |
| Isao | Toyomoto |

Signed and Sealed this

Twenty-first Day of December 1976

[SEAL]

Attest:

RUTH C. MASON
*Attesting Officer*

C. MARSHALL DANN
*Commissioner of Patents and Trademarks*